Patented May 25, 1954

2,679,537

UNITED STATES PATENT OFFICE 2,679,537

DISPOSAL OF WASTE CAUSTIC SOLUTION BY TREATMENT WITH SPENT PICKLE LIQUOR

Richard E. Knowlton, Warrensville Township, Cuyahoga County, Ohio, assignor to The Standard Oil Company, Cleveland, Ohio, a corporation of Ohio No Drawing. Application November 15, 1952, Serial No. 320,804

14 Claims. (Cl. 260—627)

This invention relates to a process for treating spent caustic petroleum refinery waste liquors to dispose satisfactorily of the waste.

In many petroleum refineries, gasoline blending stocks are treated with a strong caustic solution, which in some cases may contain free sulfur dissolved therein. During this treatment the caustic solution extracts undesirable sulfur compounds such as corrosive mercaptans, and cresylic acids from the gasoline. "Cresylic acids" is a general term used in the petroleum industry to refer to the entire range of phenolic and related compounds found in crude petroleum or formed during catalytic cracking. The caustic will contain considerable amounts of these cresylic compounds usually as the sodium salts thereof and, since the gasoline stocks commonly contain hydrogen sulfide, the caustic solution will also contain sulfide compounds after the treatment.

Disposal of waste caustic refinery liquor obtained by this treatment creates a serious problem because it is not possible to pump it into wells or adjacent streams and waterways because of violation of local health and pollution laws. A stream is generally considered polluted if its phenolic content exceeds a maximum value set by law, if the combined biochemical oxidation demand (BOD) and chemical oxidation demand (COD) exceed the available dissolved oxygen in the stream, and if the odor is bad. Because the spent caustic leaves the refinery at temperatures of the order of 115° F., and because of the heat of dilution of the caustic with water, streams into which it is led are warmed considerably and this reduces the normal content of absorbed oxygen. If the temperature of the stream is, for example, 80° F., it contains about 7 parts of oxygen per million parts of water at equilibrium. The combined BOD (bacterial activity is high at this temperature) and COD (due to sulfur compounds in the caustic) thereof far exceed this available oxygen value, so that the stream acquires an odor which is exceedingly objectionable. Thus the sulfides and cresylic acids in the spent caustic become a problem and represent, in the case of the cresylic compounds at least, a substance to eliminate from the disposal wastes, and to recover for other uses where the recovery can be accomplished economically. The disposal of spent refinery caustic waste is an important problem.

The steel industry likewise is faced with a serious waste liquor disposal problem. The removal of oxide scale from certain steel products is an essential operation prior to further processing. Usually this is accomplished by immersing the steel in a bath of dilute sulfuric acid for a relatively brief period. The acid dissolves the scale together with some of the base metal, resulting in an accumulation of ferrous sulfate in the bath. This treatment is called "pickling" and the liquor which results is called "pickle liquor." Eventually the pickle liquor becomes ineffective and must be disposed of. Its disposal has been a problem for many years.

A variety of acids (sulfuric, hydrochloric, nitric, hydrofluoric and phosphoric, individually and in combination) is employed, depending on the kind of product being treated, but sulfuric acid accounts for more than 90% of the tonnage pickled, and therefore disposal of sulfate pickle liquors presents the most serious problem. Spent sulfate pickle liquor normally has a composition ranging from 0.57 to 7% free sulfuric acid and from 15 to 30% ferrous sulfate when a batch pickler is used, while waste pickle liquor from a continuous pickler has from 2 to 7% free sulfuric acid and from 14 to 16% ferrous sulfate. The term "pickle liquor" as used in the specification and claims is intended to refer to sulfate pickle liquor having the aforementioned composition, whether produced by a batch or a continuous pickling process of removing the oxide scale from steel.

The development of practical processes for the recovery of useful products from waste pickle liquor has engaged the attention of a large number of workers, and many processes have been proposed. However, few of these processes have ever been operated successfully.

The easiest method is to recover ferrous sulfate and free sulfuric acid from the waste liquor. However, the demand for copperas in this country can be supplied by less than 4% of the pickle liquor produced by the steel industry alone. Moreover, copperas cannot be shipped very far economically because 45% of its weight is water of crystallization. Both ferrous sulfate and sulfuric acid are low cost chemicals so that their recovery must be accomplished by the simplest possible process and equipment. However, hot dilute sulfuric acid is corrosive and it can be processed only at high equipment and maintenance costs. Even when recovered it is not entirely satisfactory for reuse in pickling because of the tendency for impurities to accumulate. Where production of more valuable derivatives is investigated, similar difficulties are met.

Because of the apparent remoteness of any possibility that a feasible recovery process might be developed, it has become customary to discharge the spent pickle liquor into tide water, streams or lakes, either directly or through sanitary sewers. However, complaints against the pollution resulting therefrom has lead the industry to adopt other methods. The expedients most frequently employed have been lagooning the liquor to permit it to disappear through solar evaporation and seepage into the earth or into slag dumps, or treating the liquor with lime. Neutralization of the liquor with lime is costly, and the by-product thereof is calcium sulfate which has little or no market value.

In accordance with the present invention, pickle liquor is combined with spent caustic refinery waste liquors in order to separate cresylic acids and sulfur compounds therefrom and to render both wastes innocuous.

In the first stage of the process, spent pickle liquor is added to the spent caustic liquor in an amount to adjust the pH thereof to between about 6 and about 11.5, preferably between about 6.5 and 10.5. In this pH range, iron sulfides, iron hydroxides, and insoluble iron salts of cresylic acids precipitate and may be separated mechanically from the liquor such as by settling, filtering or centrifuging.

In an alternative embodiment of the process, either the pickle liquor or the spent refinery caustic may be oxidized before they are mixed, or alternatively the mixture may be oxidized before it is filtered. The oxidation may be accomplished by blowing oxygen through the liquid or it may be accomplished by an oxidizing agent such as chlorine, chlorates, hypochlorates, chlorine dioxide, hydrogen peroxide and other peroxides and other compounds well known in the art as oxidizing agents. The oxidizing step may be carried out at a pressure of from atmospheric to 200 pounds per square inch and at a temperature of about 35° F. up to a boiling point of the liquor at the pressure of the oxidation.

After the precipitate is separated, cresylic acids may be recovered by adding additional spent pickle liquor, or preferably a mineral acid such as sulfuric or hydrochloric acids, to the residual liquor to adjust the pH to a value in the acid range. The exact pH will depend on the particular caustic liquor being treated and the cresylic acids to be separated, but it will generally be between about 3 and 5 or 6, preferably about 5. The cresylic acids, depending on their specific gravity, may separate as a water insoluble upper layer and may be skimmed from the top or separated centrifugally.

If any soluble cresylic acids remain, they may be removed by extraction with a water-immiscible solvent therefor, such as petroleum naphtha. A final residual liquor may be run to waste through the sewers. If any solids remain before discharge they may be settled or the liquid filtered before discharge. Before the solvent extraction or before discharge the acidity may be neutralized in part or completely.

While I do not intend to be bound by any theory or any explanation of the results obtained in accordance with my invention, it is likely that that iron in the pickle liquor reacts with the sulfides and phenolates of the spent caustic refinery waste to form insoluble iron compounds together with iron hydroxide. The precipitate probably also adsorbs and occludes phenolic compounds and other undesirable components such as oils and waste solids. Separation of the precipitate removes essentially all of the sulfides and sulfur compounds and the bulk of the phenolic compounds.

If the process utilizes the oxidation step described heretofore, it is believed that at least a part of the ferrous iron in the pickle liquor is converted to ferric iron and the flocculating and adsorbing properties of the precipitate are enhanced. Sulfuric acid in the pickle liquor also tends to precipitate the available free sulfur at the lower pH range.

If the amount of phenolic compounds in the residual liquor is still too high to be discharged, the bulk of any remaining phenolic compounds may be separated by acidifying the solution as explained heretofore since these phenolic compounds are insoluble in an acid solution. If after this treatment the amount of phenolic compounds is still too high for a disposal which requires an especially low phenolic content, the residual liquor may be extracted with a hydrocarbon solvent such as petroleum naphtha.

Phenolic compounds which are present in the precipitate after filtration or other separation may also be recovered by treating the precipitate to extraction with a hydrocarbon solvent such as petroleum naphtha.

The following examples illustrate application of the invention to typical caustic refinery waste liquors:

Example 1

A spent caustic refinery waste liquor was taken having the following analysis:

| | |
|---|---|
| Gravity | 8.8° Bé. (7% NaOH by wt.). |
| pH | 12.6. |
| $S^=$ | 1.91% by wt. as $Na_2S$. |
| $HS^-$ | 0.40% by wt. as NaHS. |
| $S_2O_3^=$ | 0.93% by wt. as $Na_2S_2O_3$. |
| Cresylic (phenolic) compounds | 0.93% by wt. as phenol. |
| Total sulfur | 3.41% by wt. as S. |
| Sodium polysulfide ($Na_2S_{2.5}$) | 2.98% by wt. |

To a quantity of the above-described spent refinery caustic waste was added an amount of spent pickle liquor containing 29.3 weight per cent ferrous sulfate and 3.5 weight per cent sulfuric acid so that the mixture had a pH of 6.5. A precipitate formed which was separated by filtration.

The filtrate was acidified with sulfuric acid to a pH of 4.0 and the oily layer of the cresylic acids was skimmed from the top.

Example 2

The process of Example 1 was repeated and the residual liquor after the cresylic acids had been skimmed therefrom was extracted with petroleum naphtha at room temperature to remove additional phenolic compounds. The residual liquor was neutralized to a pH of about 6.5 with soda ash before it was discharged to the sewer. The remaining clear liquor contains 0.09% cresylic acids as phenol.

Example 3

The process of Example 1 was repeated and the precipitate which was separated in the filtration step was extracted with petroleum naphtha at room temperature to recover phenolic compounds therefrom which may be recovered from petroleum naphtha by distillation.

Example 4

The pickle liquor described in Example 1 was oxidized by treating 1000 parts by weight of it with 8.2 parts of chlorine as an oxidizing agent, at a pressure of 50 pounds per square inch, at an ambient temperature for one hour. The resulting pickle liquor is mixed with the spent refinery caustic waste and processed as in Example 1.

*Example 5*

Twenty-six parts by volume of spent pickle liquor and 100 parts of spent refinery caustic waste described in Example 1 are mixed in proportion so that the resulting solution has a pH of 9.4. The mixture is oxidized by blowing with air at a pressure of 15 pounds per square inch, at a temperature of 76° F. for 70 minutes. The resulting precipitate is separated by filtration and the remaining materials may be processed as in Example 2.

It will be apparent that the process of the invention accomplishes the mutual disposal of two spent waste liquors at very slight cost, the only additional materials required being mineral acids and petroleum naphtha, and even the use of these being optional. As a by-product of rendering these liquors innocuous, cresylic acid mixtures are recovered. These may be treated to separate phenols and cresols therefrom, if desired. The treated waste liquors are substantially free of sulfur compounds and cresylic acids, and therefore disposable in sewers in the ordinary way, or even in streams and waterways without danger of polluting them.

Numerous changes and modifications may be made in the process without departing from the spirit thereof, as will be apparent to those skilled in the art. For example, the process may be carried out as either a batch or a continuous method. Any conventional method of separating the several precipitates from the liquor may be used, such as filtration, centrifuging, or settling.

I claim:

1. A process of treating a spent caustic refinery waste liquor comprising sulfur compounds and cresylic acids and a spent pickle liquor produced in sulfuric acid pickle of ferrous metal comprising an iron sulfate and sulfuric acid, to dispose of both said waste products, which comprises mixing (1) said spent refinery caustic waste liquor and (2) spent pickle liquor in proportions to produce (3) a resulting solution having a pH of from above about 6.0 to 11.5 to form a precipitate, separating the precipitate, and acidifying the remaining liquor to a pH of 3 to less than 6.0 to separate the cresylic acids therefrom.

2. The process of claim 1 in which the precipitation is carried out at a pH of about 6.5 to 10.5 and the acidification to separate phenols is carried out at a pH of about 5.

3. The process of claim 1 in which the separated cresylic acids are skimmed from the top of the residual liquor.

4. The process of claim 3 in which the liquor is neutralized after the cresylic acids are separated.

5. The process of claim 3 in which the residual liquor is extracted with a water-immiscible cresylic acid solvent to recover additional cresylic acids therefrom.

6. The process of claim 4 in which the neutralized residual liquor is extracted with a water-immiscible cresylic acid solvent to recover additional cresylic acids therefrom.

7. The process of claim 5 in which the solvent is petroleum naphtha.

8. The process of claim 6 in which the solvent is petroleum naphtha.

9. The process of claim 1 in which the precipitate is extracted with a cresylic acid solvent to remove cresylic acids therefrom.

10. The process of claim 9 in which the solvent is petroleum naphtha.

11. The process of claim 1 in which one of said three mentioned liquids is oxidized before the precipitate is separated.

12. The process of claim 11 in which the pickle liquor is oxidized before mixing with the refinery waste liquor.

13. The process of claim 11 in which the mixture of pickle liquor and refinery waste liquor is oxidized before separation of the precipitate.

14. The process of claim 13 in which the oxidation is accomplished by blowing with air.

No references cited.